United States Patent
Balandin et al.

(10) Patent No.: US 8,111,623 B2
(45) Date of Patent: Feb. 7, 2012

(54) NODE, METHOD AND SYSTEM FOR CONTROL OF COMMUNICATION INCLUDING A BUFFER

(75) Inventors: Sergey Balandin, Helsinki (FI); Michel Gillet, Helsinki (FI)

(73) Assignee: Nokia Corporation, Espoo (FI)

(*) Notice: Subject to any disclaimer, the term of this patent is extended or adjusted under 35 U.S.C. 154(b) by 844 days.

(21) Appl. No.: 11/730,080

(22) Filed: Mar. 29, 2007

(65) Prior Publication Data

US 2007/0237076 A1  Oct. 11, 2007

Related U.S. Application Data

(60) Provisional application No. 60/787,214, filed on Mar. 30, 2006.

(51) Int. Cl.
*H04L 12/26* (2006.01)
(52) U.S. Cl. .......................................... 370/236
(58) Field of Classification Search .............. 370/229, 370/235, 236, 389, 412, 351
See application file for complete search history.

(56) References Cited

U.S. PATENT DOCUMENTS

| | | | |
|---|---|---|---|
| 6,385,201 B1* | 5/2002 | Iwata ............................ | 370/400 |
| 2002/0150049 A1 | 10/2002 | Collier et al. | |
| 2003/0037163 A1* | 2/2003 | Kitada et al. .................. | 709/236 |
| 2003/0117958 A1* | 6/2003 | Nation et al. .................. | 370/235 |
| 2006/0221948 A1* | 10/2006 | Benner et al. .................. | 370/389 |
| 2006/0288237 A1* | 12/2006 | Goodwill et al. ............. | 713/193 |

FOREIGN PATENT DOCUMENTS

| | | |
|---|---|---|
| CN | 1337130 A | 2/2002 |
| WO | 0042792 A1 | 7/2000 |
| WO | WO 00/41365 * | 7/2000 |
| WO | WO 01/63856 A1 | 8/2001 |

OTHER PUBLICATIONS

Merritt, Rick, Mobile chip interface gets real, EE Times, Feb. 13, 2006, pp. 1-12.*
Business Wire, Alliance Releases Two Standards to Ease Camera Phone Development; Mobile Industry Collaborates on CSI-2 and D-PHY Specifications for Serial Camera Interface, Nov. 30, 2005, Business Services Industry, pp. 1-4.*
Bedekar, Anand S. et al., *A Lossless Algorithm for BSSGP Flow Control in GPRS and EDGE*, IEEE Global Telecommunications Conference, Dec. 1-5, 2003, vol. 7 of 7, XP 010677195, pp. 3462-3467.
International search report PCT/IB2007/000790 filed Mar. 20, 2007.
Chinese Office Action, Chinese Patent Application No. 200780019024.X, Issuing Date: Jan. 26, 2011, pp. 1-5, English Translation: pp. 1-6.

* cited by examiner

*Primary Examiner* — Derrick Ferris
*Assistant Examiner* — Omar Ghowrwal
(74) *Attorney, Agent, or Firm* — Squire, Sanders & Dempsey (US) LLP

(57) ABSTRACT

A node configured to communicate with at least one further node. The node includes a buffer configured to receive data transmitted from the at least one further node. The node also includes an output configured to transmit data to the at least one further network element. The data includes information about the ability for the buffer to receive further data transmitted from the further node.

23 Claims, 3 Drawing Sheets

NODE, METHOD AND SYSTEM FOR CONTROL OF COMMUNICATION INCLUDING A BUFFER

CROSS-REFERENCE TO RELATED APPLICATIONS

This application claims priority of U.S. Provisional Patent Application Ser. No. 60/787,214, filed Mar. 30, 2006. The disclosure of the prior application is hereby incorporated by reference in its entirety.

BACKGROUND OF THE INVENTION

1. Field of the Invention

The invention relates to a node and more specifically but not exclusively to a node within a mobile communications device.

2. Description of the Related Art

User equipment have become application rich personal devices capable of more than voice communication. It is for example difficult to purchase user equipment which does not feature a digital camera connected to internal digital image processing elements, polyphonic audio synthesizing equipment. It is also common for user equipment to be connected or incorporate advanced features such as satellite navigation and audio and video recording and playback.

In order that the components of the user equipment can communicate with each other user equipment is equipped with a communications link or network designed in such a way that internal systems can communicate with each other to generate this functionality, and that external systems can also be connected to the user equipment, to enable the user equipment to be upgradeable.

A known example of such a communication network is the serial interface known as D-Phy (proposed by the mobile industry processor interface alliance (MIPI)). The D-Phy serial interface supports as many as four lanes operating at rates up to 1 Gbit per second per lane and uses low-voltage, source-synchronous, scalable-signalling technology.

Operating on these physical networks are protocol stacks. The protocol stacks define how data is transmitted across the physical network. For example the MIPI unified protocol (UniPRO) defines standards for transmitting data packet over the D-Phy network.

The current MIPI UniPRO standards and the protocols used by other proprietary user equipment networks suffer from the problem of data integrity—in other words relying that the data transmitted by the data originator (or first end node) of the network has been received and is being processed by a data final destination (or second end node). In these networks the nodes have a limited capacity for receiving and processing data. Thus when the final destination node reaches the capacity the node can not physically receive or process the any further data transmitted through the network.

In these situations the typical network protocol allows implements either a stop or discard process.

The stop process instructs the final destination node to stop accepting traffic from the network. This results in "head of line blocking" where the data being transmitted is queued in the network nodes between the two end nodes. This queued data causes the network nodes to effectively block the node from passing any further data until the next node accepts the current data packet. This blocking therefore propagates from the final destination node to the originator node resulting in partial or full blocking of the network.

The discard process instructs the final destination node to drop a packet. This allows the network to operate efficiently and without blockage, but results in a loss of end-to-end (E2E) reliability as even if the data is reaches the final destination node the data can not be guaranteed to have received and processed the data.

Point-to-point (P2P) data flow control is known. In such systems the data transmitted between two immediate nodes can be acknowledged to confirm its receipt. These P2P systems can be divided into two groups.

The first group employs flow control without synchronisation information by using flow control tokens. One example is the Spacewire system. These systems have further problems in that they are required to employ complex mechanisms for recovering loss of the flow control tokens. Furthermore it is difficult to estimate the data overhead of transmitting control tokens which prevent such systems from producing accurate quality of service provisions in bandwidth limited networks.

The second group of P2P systems operate flow control with synchronisation information. These typically apply techniques synchronising the flow control information at both ends with every flow control signalling packet and therefore are complex and require a greater signalling overhead than the token based group. An example of this synchronised flow control signalling can be found the P2P flow control mechanism featured within the current MIPI UniPRO specifications.

Using the P2P flow control mechanisms for both point-to-point and end-to-end reliability produces additional complexity with regards to signalling overhead and complexity of nodes within the network whilst producing a system which is not optimal for end-to-end flow control.

SUMMARY OF THE INVENTION

Embodiments of the present invention aim to address or at least partially mitigate the problems disclosed above.

According to a first aspect of the invention there is provided a node arranged to communicate with at least one further node; comprising: a buffer arranged to receive data transmitted from the at least one further node; an output arranged to transmit data to the at least one further network element, wherein the data comprises information about the ability for the buffer to receive further data transmitted from the further node.

The node may further comprise a detector arranged to indicate capacity within the buffer to receive the data from the at least one further node;

The data transmitted to the at least one further node may be a data packet.

The information about the ability for the buffer to receive further data transmitted from the further node is preferably an end-to-end flow control signal.

The node is preferably arranged to communicate over a network within an user equipment.

The node is preferably arranged to communicate over a network at least partially external to an user equipment.

The network is preferably a D-Phy network.

The data packet may be a UniPRO standard data packet.

The information about the ability of the buffer to receive further data transmitted from the further node is preferably located within the ATyp=xx field of the UniPRO standard data packet.

The information about the ability of the buffer to receive further data transmitted from the further node is preferably the binary value 01 in the ATyp=xx field.

The data may comprise a header and a payload, wherein the information about the ability for the buffer to receive further data transmitted from the further node is located within at least one of: the header and the payload.

The detector is preferably arranged to indicate when the capacity of the buffer is greater than or equal to a predetermined capacity value.

The predetermined capacity value is preferably transmitted to the node on initialisation of the communication with the at least one further node.

The node may further comprise reservation logic for reserving the predetermined capacity value within the buffer.

According to a second aspect of the invention there is provided a node arranged to communicate with at least one further node; comprising: an input arranged to receive information about the ability for a buffer of the at least one further node to receive further data transmitted from the node; a detector arranged to detect the information; a counter arranged store a value to indicate the ability of the at least one further node to receive further data packets transmitted from the node; an output arranged to transmit further data to the further node dependent on the counter value indicates that the at least one further node has the ability to receive the further data.

The reception of the information about the ability for a buffer of the at least one further node to receive further data is preferably arranged to increment the counter value.

The counter is preferably arranged to increase the counter value dependent on the information about the ability for a buffer of the at least one further node.

The counter is preferably arranged to decrement the counter value when the output transmits further data to the at least one further node.

According to a third aspect of the invention there is provided a network comprising at least one node as claimed latterly and at least one node as also described formerly.

According to a fourth aspect of the invention there is provided a network comprising a first node and at least one further node, wherein information is provided within data comprising a payload transmitted at least one of the first node to the at least one further node and from the at least one further node to the first node.

According to a fifth aspect of the invention there is provided a method for communicating between a first node and at least one further node in communication over a network, comprising the steps of: transmitting from the first node to the at least one further node data comprising information about the ability of the first node to receive further data transmitted from the further node, and receiving at the at least one further node the data comprising information about the ability of the first node to receive further data transmitted from the further node.

The method may implement an end-to-end flow control mechanism

The method may further comprise the step of: incrementing a counter value within the at least one further node dependent on the reception of data comprising information about the ability of the first node to receive further data transmitted from the further node.

The step of incrementing the counter value may increment the counter value dependent on the value of the information.

The method may further comprise the steps of: transmitting further data from the at least one further node to the first node dependent the counter value; and decrementing the counter value.

The step of decrementing the counter value may decrement the counter value dependent on the size of the further data transmitted from the at least one further node to the first node.

According to a sixth aspect of the present invention there is provided a computer program arranged to operate a computer for communicating between a first node and at least one further node in communication over a network, comprising the steps of: transmitting from the first node to the at least one further node data comprising information about the ability of the first node to receive further data transmitted from the further node, and receiving at the at least one further node the data comprising information about the ability of the first node to receive further data transmitted from the further node.

BRIEF DESCRIPTION OF THE DRAWINGS

For better understanding of the invention, reference will now be made by way of example to the accompanying drawings in which.

DETAILED DESCRIPTION OF THE PREFERRED EMBODIMENTS

Embodiments of the present invention relate particularly but not exclusively to MIPI UniPro architecture on top of D-Phy network as employed in user equipment. Embodiments of the invention may be applicable to other user equipment networks for connecting elements within user equipment. For example other embodiments may be employed for use over the Nokia proprietary discobus architecture.

Figure 1:
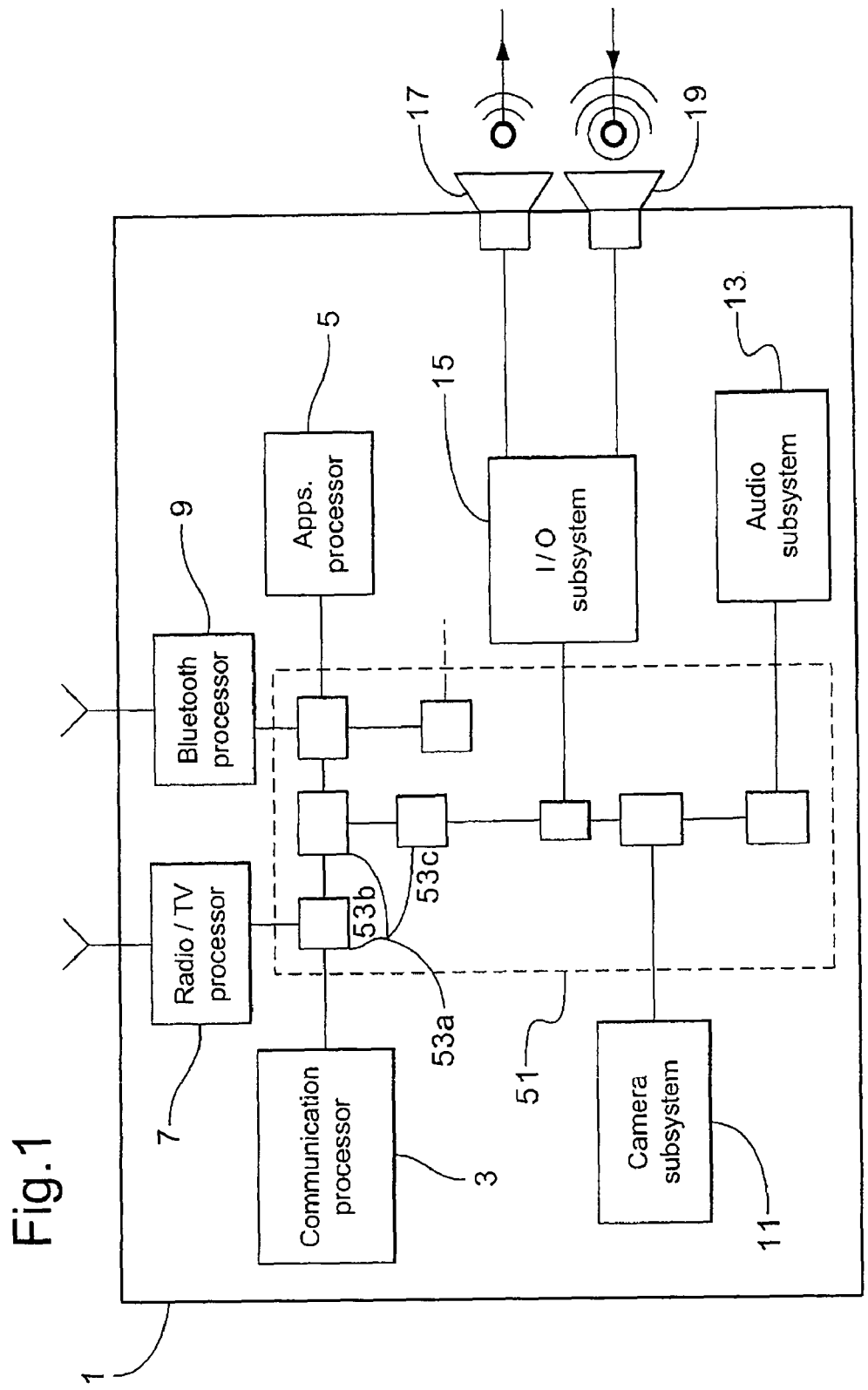
FIG. 1 shows a schematic view of a user equipment network over which embodiments of the present invention may be implemented.

Reference is made to FIG. 1 which shows a user equipment comprising several component subsystems connected together via the D-Phy network 51. For clarity components of the user equipment not directly concerned with the present invention are not shown.

It should be appreciated that while embodiments of the invention have been described in relation to user equipment such as mobile stations, embodiments of the invention are applicable to any other suitable type of user equipment. In this document the term, terminal, where used is intended to cover all the examples of user equipment described.

The term user equipment can apply to any appropriate mobile device adapted for communication to a wireless cellular communications network. For example, the mobile user equipment may access the cellular network by means of a Personal computer (PC), Personal Data Assistant (PDA), mobile station (MS) and so on.

The network 51 comprises a series of nodes 53 which act as switches or routers for receiving and distributing packets in a known manner.

The network 51 is also shown connected to a series of processors or sub-systems for carrying out various processes or applications associated with the user equipment. For example, the network is connected to a communications processor 3 (for communicating with the cellular network), an applications processor 5 (arranged to controlling the operation of applications), a radio/TV processor 7 (arranged to receive either analogue/digital radio/TV signals), a Bluetooth processor 9 (arranged to receive and transmit Bluetooth data over a Bluetooth communications channel), a camera subsystem 11 arranged to receive and transmit digital image data from the camera (the camera in some embodiments be connected to the network and transmit raw data to the camera sub-system 11), an audio sub-system 13 (arranged to transmit audio data for example MP3 audio data), and a I/O subsystem 15 connected to the earpiece/speaker 17 and the microphone 19. These processors/subsystems described are examples only and some embodiments of the present invention may have more or fewer sub-systems connected to the network 51. Furthermore in some embodiments at least one sub-system is connected to the network 51 via an external connection not shown in FIG. 1.

As has been described previously P2P flow control can be used by the network 51, so that each sub-system or network node can guarantee that the packet integrity between nodes.

Figure 2:
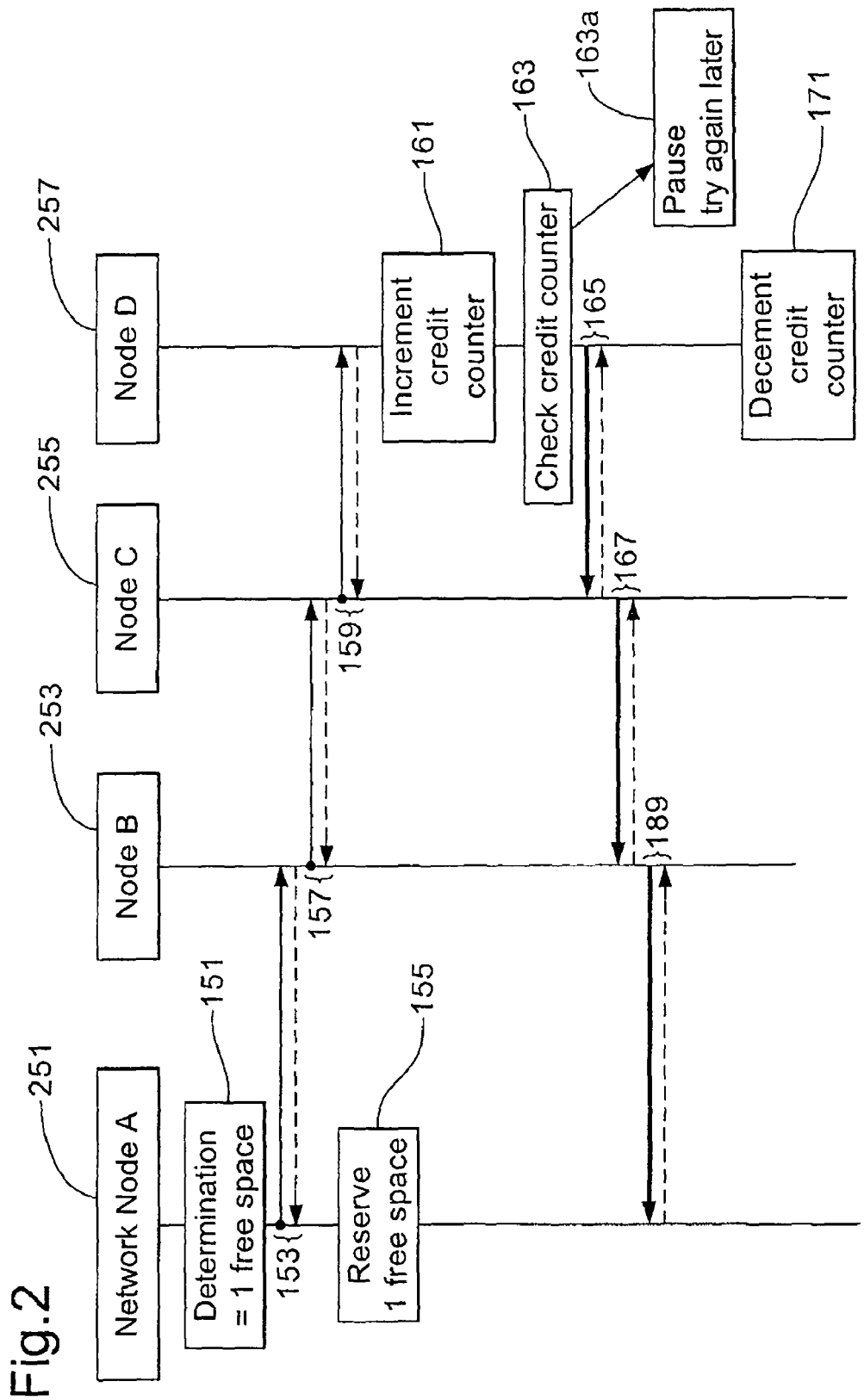
FIG. 2 shows a schematic view of the data flow as produced by the present invention.
Figure 3:
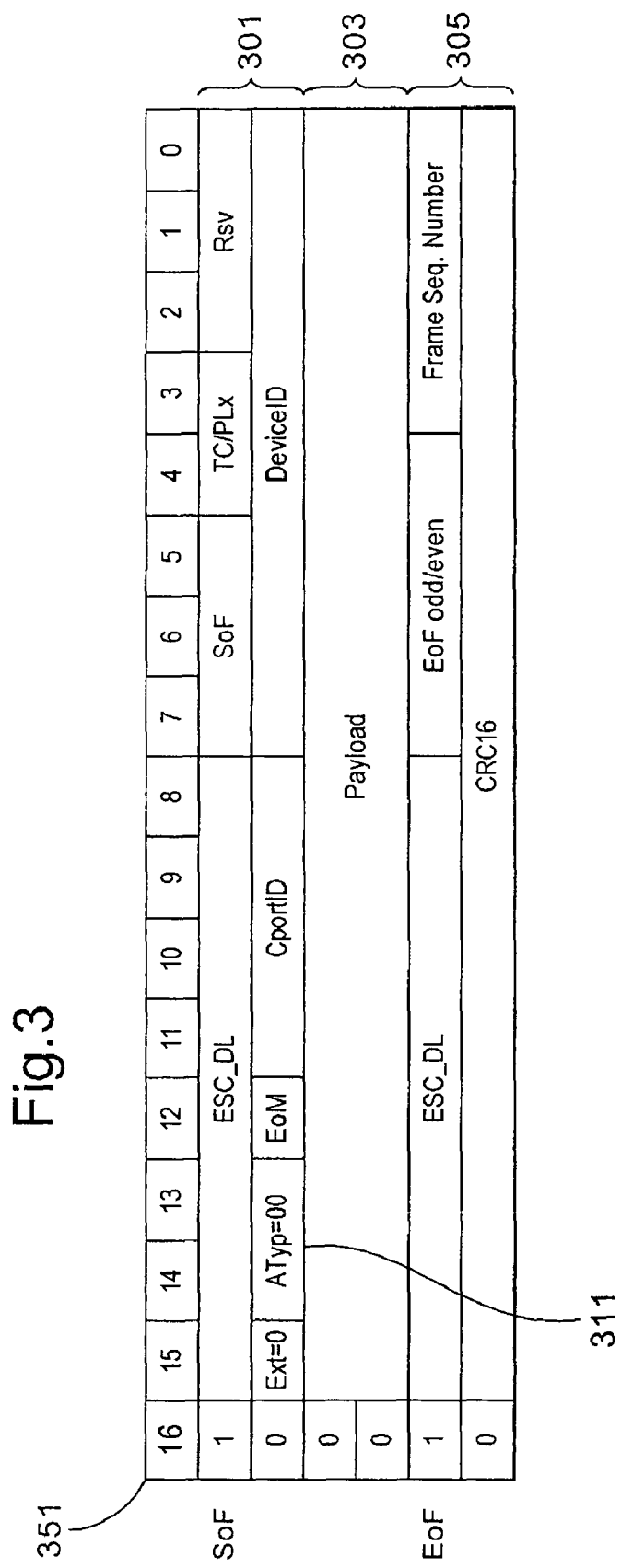
FIG. 3 shows a schematic view of a E2E flow control signal embedded in a data packet as employed by embodiments of the present invention.

With regards to FIGS. 2 and 3 an End-to-End flow control (E2E FC) mechanism, embodying the present embodiments of the invention, is described with respect to a D-Phy network.

With regards to FIG. 2 the data flow of an embodiment of the E2E flow control mechanism is shown. FIG. 2 shows two network end nodes, node A 251 and node D 257, in communication with each other via intermediate nodes, node B 253 and node C 255. At least one of the end nodes comprising, a output for transmitting data to the network, an input for receiving data from the network, a buffer connected to the input for storing the received data, and a detector (such as a pointer) arranged to indicate the capacity within the buffer to receive further data. Furthermore the other end node comprises a counter indicating the capacity of the end node. The other end node comprises an input arranged to receive data from the network, an output for transmitting data to the network, data processing means, which can be hardware, software or a combination thereof, arranged to detect or evaluate the counter value and allow or stop the other end node from transmitting data containing a payload to the end node.

In a network arranged for duplex (two-way) communication system both end nodes comprise both sets of elements described above.

The arrangement described hereafter demonstrates an example of the flow control mechanism as implemented within an embodiment of the invention, and it would be understood by the person skilled in the art that the two end nodes could be connected directly together or separated by any number of intermediate nodes in further embodiments.

The steps 151 to 161 describe the 'crediting' E2E flow control steps, or 'credit' cycle. In other words the situation when a first end node indicates to another end node that there is free space on the first end node. The steps 163 to 171 describe the 'debiting' E2E flow control steps, or 'debit' cycle. The 'debit' cycle is the situation when the node uses the 'credit' allocated to the node to transmit data packets.

In step 151 the network end node A 251 determines that it has capacity to receive at least one portion of data (or has at least one 'free-space' for data). This in an embodiment of the invention can be implemented by a pointer or pair of pointers pointing to memory locations in a buffer. The number of memory locations between a read and write pointer in a buffer can indicate the presence and amount of free memory available.

In step 153, in response to this determination, end node A 251 transmits via its output an E2E flow control signal to node B 253 (the E2E flow control signal is addressed to end node D 257 but has to initially be transmitted to intermediate nodes B 253 and C 255). The transmission of the E2E flow control signal is represented in FIG. 2 by the solid line with an arrowhead showing the direction of transmission.

Node B 253 receives the E2E flow control signal and using a conventional P2P flow control mechanism (such as the transmission of an acknowledgement message to the transmitting node) confirms to end node A 251 that the E2E flow control signal has been successfully received by node B 253. The P2P flow control mechanism is represented in FIG. 2 by the dashed line with an arrowhead showing the direction of the acknowledgement message.

In step 155, after transmitting the E2E flow control signal, node A reserves the free space in the receiver or processor buffer so that only packets received originating from end node D 257 can be stored in the reserved free space. This can be implemented within a buffer by a pointer pointing to a memory location within a buffer which points to the next unreserved memory location.

In step 157 node B 253 transmits the E2E flow control signal to node C 255. Node C 255 receives the E2E flow control signal from node B 253 and using a conventional P2P flow control mechanism (such as the transmission of an acknowledgement message to the transmitting node) confirms to node B 253 that the E2E flow control signal has been successfully received by node C 255.

In step 159 node C 255 transmits the E2E flow control signal to end node D 257. Node D 257 receives the E2E flow control signal from node C 255 and using a conventional P2P flow control mechanism (such as the transmission of an acknowledgement message to the transmitting node) confirms to node C 255 that the E2E flow control signal has been successfully received by node D 257.

Providing the P2P flow control mechanism within the network is operational and not producing erroneous results, end node A 253 can assume that the E2E flow control signal has been correctly transmitted to end node D 257.

In a further embodiment of the invention, a further safeguard is implemented. In this embodiment end node D 257, on receiving the E2E flow control signal, transmits to end node A 251 via the nodes C 255 and B 253 an acknowledgement message confirming the successful receipt of the E2E flow control signal.

In step 161, end node D 257 on receipt of the E2E flow control signal increments an internal counter. The internal counter indicates the 'credit' limit of the end node A, in other words the amount of free-space reserved at node A 251 for node D 257 data.

In step 163, end node D 257 determines that is has a data packet to transmit to end node A 251. End node D 257 then examines the value stored in its internal counter. If the counter is equal to zero, and therefore there is no indicated free space, then the method passes to step 163a. In step 163a end node D 257 does not transmit any packets to end node A and will pass back to step 163 to check the internal counter at some time later. In some embodiments of the invention the end node D waits a predetermined or random time period before performing the internal counter check again, in other embodiments of the invention the end node D only checks the internal counter after receiving an E2E flow control signal.

If the counter is not equal to zero, then the method passes to step 165.

In step 165, end node D 257 transmits a data packet to node C 255 (the packet is addressed to end node A 251 but has to initially be transmitted to intermediate nodes B 253 and C 255). The transmission of the packet is represented in FIG. 2 by the thick line with an arrowhead showing the direction of transmission.

Node C 255 receives the packet and using a conventional P2P flow control mechanism (such as the transmission of an acknowledgement message to the transmitting node) confirms to end node D 257 that the packet has been successfully received by node C 255. The P2P flow control mechanism is represented in FIG. 2 by the dashed line with an arrowhead showing the direction of the acknowledgement message.

In step 167 node C 255 transmits the data packet to node B 253. Node B 253 receives the data packet from node B 255 and using a conventional P2P flow control mechanism (such as the transmission of an acknowledgement message to the transmitting node) confirms to node C 255 that the data packet has been successfully received by node B 253.

In step 169 node B 253 transmits the data packet to end node A 251. Node A 251 receives the data packet, via the node input, from node B 253 and using a conventional P2P flow control mechanism (such as the transmission of an acknowledgement message to the transmitting node) confirms to node B 253 that the data packet has been successfully received by node A 251.

In step 171 end node D decrements the internal counter value.

In a further embodiment of the invention, a further safeguard is implemented. In this embodiment end node A 251, on receiving the data packet, transmits to end node D 257 via the nodes C 255 and B 253 an acknowledgement message confirming the successful receipt of the data packet. It is then in response to this step that the end node D decrements the internal counter.

Thus providing the P2P flow control mechanism within the network is operational and not producing erroneous results, end node D 257 can assume that the data packet has been correctly transmitted to end node A 251.

Furthermore the E2E flow control mechanism as described above also enables the end node D to assume that the data packet is also not simply going to be discarded by end node A even if it has been correctly transmitted to end node A 251.

Each E2E flow control signal received by the end node provides the end node with the permission to sending one portion of data. The size of one portion or the 'free space' can be set dependent on each connection—for example to be dependent on the buffer sizes of the end nodes or the intermediate nodes. In some embodiments of the invention this is determined during the initial connection establishment procedure. In other embodiments of the invention the portion size or 'free-space' is set using a preconfigured connection setting.

Although FIG. 2 shows a 'debit' cycle (i.e. a transmission of a data packet) immediately following a 'credit' cycle (i.e. the transmission of a E2E flow control signal) it would be understood by the person skilled in the art that at least two 'debit' or 'credit' cycles can be implemented without intervening 'debit' or 'credit' cycles respectively. For example end node A 251 after reserving the portion or 'free-space' size at the end node A 251 after detecting further sufficient capacity for a further portion could transmit a further E2E flow control signal to the end node D 257 before the end node D transmits a data packet.

In some embodiments of the invention where the network is a true duplex network the 'debit' cycles and 'credit' cycles can be implemented concurrently, for example providing that there is sufficient credit (i.e. the internal counter is not equal to zero) node D 257 transmits a data packet to end node A 251, whilst on detecting sufficient capacity in end node A 251 transmits an E2E flow control signal to end node D 257.

The above 'credit' cycle from node A 251 to end node D 257 describes the situation where a connection has been established. In such a system the end node D 257 does not initially know the end node A 251 capacity and is only informed of it by the transmission of E2E flow control signals.

If the capacity of end node A is high for example after resetting the user equipment, the establishment of the connection or after flushing the buffer, the data packet rate from end node D 257 to end node A 251 is lower than the optimal rate as node D 257 awaits E2E flow control signals before sending data packets. In some embodiments of the invention an E2E flow control signal is transmitted with the connection establishment confirmation and at the connection restart after reset. This E2E flow control signal is interpreted by the end node as a full buffer 'credit' i.e. permission to use the full buffer capacity of the other end node. In such embodiments the end node determines the other end node's buffer size (for example all end nodes of the network can have a predefined minimum buffer size—which is used as the initial counter value, or the buffer size is transmitted as part of the connection establishment message—which is then used as the initial counter value).

FIG. 3 shows one possible implementation of the E2E packet data unit (PDU) 51.

The PDU comprises a header 301, body 303 and tail portion 305. The header 301 comprises the fields: ESC_DL which is a special code, which allows to distinguish control symbols from data symbols, SoF which is a code that tells that this control symbol starts a new frame, TC/PLx which defines the traffic class or priority level field which identifies to which priority group the frame belongs (has direct impact on the treatment procedure in both ends of the link), Rsv which is a reserved field, Ext=x which is an extension bit which permits packet header to be extended (this bit is set to 0 for conventional header length, but is set to 1 to indicate an extension of the header into the first symbols of the payload, EoM which indicates that this frame is the last frame of the Transport layer message (which for transmission over the network might be split to a number of Datalink layer frames), CportID which is the unique ID number of a port at the destination device within a stack of ports for Connection Oriented applications, and DeviceID which is the unique address of the destination node. The header also comprises the ATyp=xx field 311, where xx is a pair of binary values.

The body 303 of the datagram is contains the payload field, the payload is typically the data to be transmitted.

The tail 305 of the datagram comprises the fields: ESC_DL, EoF odd/even which indicates that this is the last control symbol of the frame, Frame sequence number which is a sequence number of the frame in the Datalink layer transmission, which is used for providing P2P reliability, and CRC16 which is a 16 bit cyclic redundancy check value of the payload data.

In embodiments of the invention the E2E flow control signal is stored as a value of the ATyp=xx header field 311 or by not currently used by the data packet for any other use. For example The value in an embodiment to indicate that the data packet contains an E2E flow control signal is where the data packet header field has a value ATyp=01.

As can be appreciated the E2E flow control signal embedded within the UniPRO data packet structure has a further advantage in that the E2E flow control signal can be transmitted as part of a data packet from one end node to the other end node. In such an embodiment the 'credit' cycle for the link from end node A 251 to end node D 257 can be embedded within the 'debit' cycle for the link passing the opposite way—in other words from end node D 257 to end node A 251.

Where data traffic is unequal or one-directional the data packets containing the E2E flow control signal can be transmitted by transmitting an empty packet (i.e. a data packet that contains only a header and tail and with no payload).

Thus embodiments of the invention proposes an E2E flow control mechanism which is both efficient (the signalling overhead being contained with data being transmitted by the return path) and is also robust (the embodiments of the invention use the P2P flow control mechanisms implemented with regards to data packet transmission), and with minor modification of the end node logic (the end nodes are required to examine one of the data packet fields and to comprise a counter which is modified on transmission of payload containing packets to the end node and receipt of packets comprising predetermined header values).

The embodiments further results in a minimal increase of the signalling overhead and under certain conditions do not even introduce additional overhead at all. Comparing to the embodiments of the present invention against prior art solutions, the embodiments are more efficient in respect of all consumed resources—implementation gate count, power consumption, and signalling overhead.

Furthermore the amount of E2E flow control signalling overhead is predictable, which enables the maintenance of Quality of Service guarantees for networks with bandwidth reservation.

As will be appreciated by the person skilled in the art, although FIG. 3 shows the E2E flow control signal being embedded within a UniPRO datagram and specifically within the ATyp=xx header field 311, it would be appreciated that the E2E flow control signal could be embedded within a different part of the datagram.

In a further embodiment of the invention the E2E flow control signal could be embedded within the data packet payload.

In further embodiments of the invention the UE network is a serial network other than a Phy-D network and the protocol used to transmit packets is other than the UniPRO standard used to transmit UniPRO packets as shown in FIG. 3. In these embodiments the E2E flow control signal from a first end node to another end node containing permission for the another end node to transmit data from the another end node to the first end node is embedded within a data packet transmitted over the serial network from the first end node to the another end node.

In further embodiments of the invention the E2E flow control signal contains an E2E flow control value used by the end node to increment the counter. In one of these embodiments the value is used to set the counter to the value. In further embodiments of the invention the value is used to increment the counter by that value.

In some embodiments the flow control signal is capable of being modified. In other embodiments of the invention the flow control signal is modified 'on the fly' i.e. during the communication process.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus, comprising:
a buffer configured to receive data transmitted from at least one node; and
an output configured to transmit data to the at least one node,
wherein the data comprises information about an ability of the buffer to receive further data transmitted from the at least one node wherein the information is not a size of available buffer space,
wherein the information about the ability of the buffer to receive further data transmitted from the at least one node is an end-to-end flow control signal located within an ATyp=xx field of a UniPRO standard data packet,
wherein the end-to-end flow control signal is configured to provide the at least one node with permission to send one portion of data, and
wherein the apparatus is configured to operate in a D-Phy network.

2. An apparatus as claimed in claim 1, further comprising a detector arranged to indicate capacity within the buffer to receive the data from the at least one node.

3. An apparatus as claimed in claim 2, wherein the detector is configured to indicate when the capacity of the buffer is greater than or equal to a predetermined capacity value.

4. An apparatus as claimed in claim 3, wherein the predetermined capacity value is transmitted to the apparatus upon initialization of communication with the at least one node.

5. An apparatus as claimed in claim 3, further comprising reservation logic for reserving the predetermined capacity value within the buffer.

6. An apparatus as claimed in claim 1, wherein the apparatus is arranged to communicate over a network within a user equipment.

7. An apparatus as claimed in claim 1, wherein the apparatus is configured to communicate over a network at least partially external to a user equipment.

8. An apparatus as claimed in claim 1, wherein the information about the ability of the buffer to receive further data transmitted from the node is binary value 10 in the ATyp=xx field.

9. An apparatus, comprising:
an input configured to receive information about an ability of a buffer of at least one node to receive further data transmitted from the apparatus wherein the information is not a size of available buffer space;
a detector configured to detect the information;
a counter configured to store a value to indicate the ability of the at least one node to receive further data packets transmitted from the apparatus;
an output configured to transmit further data to the node dependent on the counter value indicating that the at least one node has the ability to receive the further data,
wherein the information about the ability of the buffer to receive further data transmitted from the apparatus is an end-to-end flow control signal located within an ATyp=xx field of a UniPRO standard data packet,
wherein the end-to-end flow control signal is configured to provide the apparatus with permission to send one portion of data, and
wherein the apparatus is configured to operate in a D-Phy network.

10. An apparatus as claimed in claim 9, wherein reception of the information about the ability of the buffer of the at least one node to receive further data is configured to increment the counter value.

11. An apparatus as claimed in claim 10, where in the counter is configured to increase the counter value dependent on the information about the ability of the buffer of the at least one node.

12. An apparatus as claimed in claim 9, wherein the counter is configured to decrement the counter value when the output transmits further data to the at least one node.

13. A system, comprising:
a first node and at least one further node,
wherein information about the ability of a buffer to receive further data is provided within data comprising a payload transmitted from at least one of the first node to the at least one further node, or the at least one further node to the first node wherein the information is not a size of available buffer space,
wherein the information transmitted about the ability of the buffer to receive further data is an end-to-end flow control signal located within an ATyp=xx field of a UniPRO standard data packet,
wherein the end-to-end flow control signal is configured to provide the at least one node with permission to send one portion of data, and
wherein the first node and the at least one further node are configured to operate in a D-Phy network.

14. A method, comprising:
receiving, from a first node, at least one further node, data comprising information about an ability of the first node to receive further data transmitted from the at least one further node wherein the information is not a size of available buffer space; and
detecting the information about the ability of the first node to receive further data transmitted from the at least one further node,
wherein the information transmitted about the ability of the first node to receive further data is an end-to-end flow control signal located within an ATyp=xx field of a UniPRO standard data packet,
wherein the end-to-end flow control signal is configured to provide the at least one node with permission to send one portion of data, and
wherein the first node and the at least one further node are configured to operate in a D-Phy network.

15. A method according to claim 14, wherein the method implements an end-to-end flow control mechanism.

16. A method as claimed in claim 15, further comprising:
transmitting further data from the at least one further node to the first node dependent upon the counter value; and
decrementing the counter value.

17. A method as claimed in claim 16, wherein the decrementing the counter value decrements the counter value dependent on the size of the further data transmitted from the at least one further node to the first node.

18. A method as claimed in claim 14, further comprising:
incrementing a counter value within the at least one further node dependent on the reception of data comprising information about the ability of the first node to receive further data transmitted from the further node.

19. A method as claimed in claim 18, wherein incrementing the counter value increments the counter value dependent on the value of the information.

20. A non-transitory computer-readable medium encoded with a computer program configured to operate a computer to implement a method comprising:
receiving, from a first node, at least one further node, data comprising information about an ability of the first node to receive further data transmitted from the at least one further node wherein the information is not a size of available buffer space; and
detecting the information about the ability of the first node to receive further data transmitted from the at least one further node,
wherein the information transmitted about the ability of the first node to receive further data is an end-to-end flow control signal located within an ATyp=xx field of a UniPRO standard data packet,
wherein the end-to-end flow control signal is configured to provide the at least one node with permission to send one portion of data, and
wherein the first node and the at least one further node are configured to operate in a D-Phy network.

21. A system, comprising:
a first node including a buffer configured to receive data transmitted from a second node, and an output configured to transmit data to the second node, wherein the data comprises information about an ability of the buffer to receive further data transmitted from the second node wherein the information is not a size of available buffer space; and
the second node comprising an input configured to receive information about an ability of the buffer to receive further data transmitted from the first node, a detector configured to detect the information, and a counter configured to store a value to indicate the ability of the second node to receive further data packets transmitted from the first node,
wherein the information about the ability of the buffer to receive further data transmitted from the second node is an end-to-end flow control signal located within an ATyp=xx field of a UniPRO standard data packet,
wherein the end-to-end flow control signal is configured to provide the second node with permission to send one portion of data, and
wherein the first node and the second node are configured to operate in a D-Phy network.

22. An apparatus, comprising:
buffer means for receiving data transmitted from at least one node; and
output means for transmitting data to the at least one node,
wherein the data comprises information about an ability of the buffer means to receive further data transmitted from the at least one node wherein the information is not a size of available buffer space,
wherein the information about the ability of the buffer means to receive further data transmitted from the at least one node is an end-to-end flow control signal located within an ATyp=xx field of a UniPRO standard data packet,
wherein the end-to-end flow control signal is configured to provide the at least one node with permission to send one portion of data, and
wherein the apparatus is configured to operate in a D-Phy network.

23. An apparatus, comprising:
input means for receiving information about an ability of a buffer means of at least one node to receive further data transmitted from the apparatus wherein the information is not a size of available buffer space;
detector means for detecting the information;

counter means for storing a value to indicate the ability of the at least one node to receive further data packets transmitted from the apparatus, wherein the information about the ability of the buffer means to receive further data transmitted from the apparatus is an end-to-end flow control signal located within an ATyp=xx field of a UniPRO standard data packet, wherein the end-to-end flow control signal is configured to provide the apparatus with permission to send one portion of data, and wherein the apparatus is configured to operate in a D-Phy network.

* * * * *